C. A. MOORE.
AUTOMATIC SAFETY VALVE.
APPLICATION FILED FEB. 29, 1912.

1,032,849.

Patented July 16, 1912.

Witnesses
T. L. Moreau
Lillie M. Perry.

Inventor
Charles A. Moore
By E. A. Finckel
Attorney

UNITED STATES PATENT OFFICE.

CHARLES A. MOORE, OF BORDERLAND, WEST VIRGINIA, ASSIGNOR OF ONE-HALF TO CHARLES J. ADAMS, OF HATFIELD, WEST VIRGINIA.

AUTOMATIC SAFETY-VALVE.

1,032,849.     Specification of Letters Patent.     Patented July 16, 1912.

Application filed February 29, 1912. Serial No. 680,762.

*To all whom it may concern:*

Be it known that I, CHARLES A. MOORE, a citizen of the United States, residing at Borderland, in the county of Mingo and State of West Virginia, have invented a certain new and useful Improvement in Automatic Safety-Valves, of which the following is a full, clear, and exact description.

The object of this invention is to provide an automatic safety valve of simple and economical construction, and effective in operation, and which is especially designed for use on steam cylinders to relieve the cylinders of undue pressure due to the accumulation of water of condensation, and wherein the valve will open automatically upon the accumulation or sudden drawing in of water into the cylinders, and also capable of manual operation to open and close the valve.

The invention consists in an automatic safety valve comprising a body having inlet and outlet ports and a valve seat adjacent to the inlet port, a valve disk adapted to fit upon said seat, a valve stem connected with said valve disk and having a screw threaded portion, a valve-disk guide movably arranged in said body and engaging the screw-threaded portion of the valve stem, a spring and means for adjusting its tension engaging the valve-disk guide for holding the valve disk to its seat and permit its automatic operation, and a valve-operating stem slidably engaging the upper end of the valve stem to rotate the valve stem to adjust it with relation to the valve disk guide to manually open and close the valve, all substantially as I will proceed now more particularly to set forth and finally claim.

Figure 1:
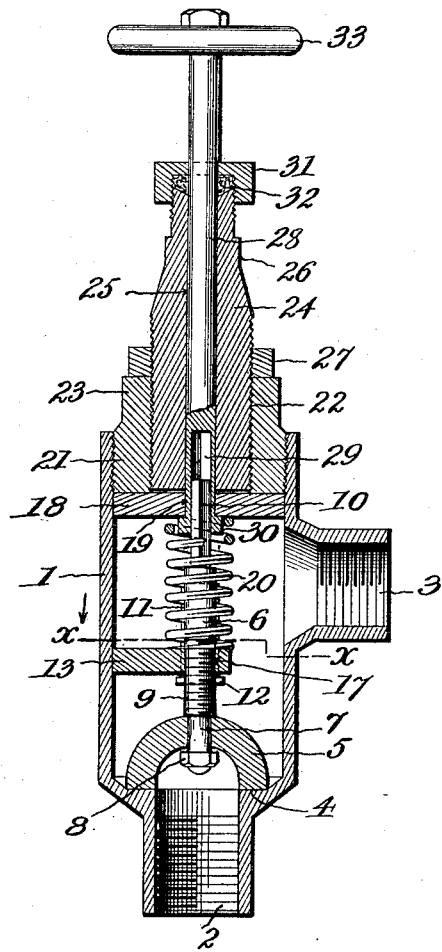
Figure 2:
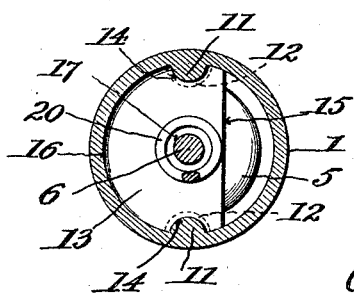

In the accompanying drawings illustrating the invention, in the two figures of which like parts are similarly designated, Figure 1 is a vertical longitudinal section, and Fig. 2 is a transverse section taken substantially in the plane of line *x—x*, Fig. 1, and looking in the direction of the arrow.

1 is the body of the valve, having the usual inlet port or cylinder connection 2, and the outlet port 3. Within the body of the valve and adjacent to the inlet port 2 is the valve seat 4, and upon and adapted to engage the valve seat is a disk valve 5, and in accordance with the present invention, said valve is preferably constructed in the form of a concavo-convex disk having its concave side arranged to fit upon and over the inlet port 2, for a purpose presently appearing.

6 is the valve stem having a smooth reduced end 7 upon which the valve 5 is loosely mounted or swiveled and held thereon by a nut 8. Preferably the reduced portion 7 of the valve stem 6 is slightly longer than the thickness of the valve disk 5 to permit a slight play between these parts to allow for expansion. Above the reduced portion 7 is a screwthreaded portion 9, and at its upper end said stem is provided with a reduced squared portion 10.

Within the body 1 of the valve is formed, by casting or otherwise, upon diametrically opposite sides, guides 11, terminating at their lower ends in shoulders or stops 12; and fitted within the body of the valve is a valve-disk guide 13 having cut-away portions 14 engaging the guides 11, and also having one of its sides slabbed off as at 15, to provide for communication between the inlet and outlet ports. It will be observed that the other side of the valve-disk guide 13 is substantially semicircular, as at 16, to afford a sliding fit upon the inside of the valve body. The valve-disk guide 13 is also provided with a centrally arranged screwthreaded opening 17 adapted to engage the screwthreaded portion 9 of the valve stem 6. Also arranged within the body of the valve is a follower disk 18 having a central perforation 19 through which the upper squared portion 10 of the valve stem 6 passes.

Surrounding the valve stem 6 and interposed between and engaging the valve-disk guide 13 and the follower disk 18 is a coiled spring 20.

Fitted in the upper end of the valve body 1 is a removable screwthreaded bushing 21 having a central screw-threaded bore 22, and an angular head 23 to receive a wrench or other tool for adjusting or removing said bushing.

Fitted within the central screwthreaded bore 22 of the bushing 21 is an adjusting bushing 24 having a longitudinal bore 25, and an angular head 26 to receive a wrench or other tool for adjusting said bushing.

Mounted upon the adjusting bushing 24, and engaging the bushing 21 is a lock-nut 27 for locking the parts in their adjusted position. Passing through the opening 19 in the follower disk 18 and also the bore 25 of the adjusting bushing 24 is a valve-operating stem 28, provided at its inner end with a squared opening 29 adapted to slidably engage the squared upper end 10 of the valve stem 6. The valve-operating stem 28 is also provided at its inner end with an enlargement or head 30 for engaging and holding in place the follower disk 18. The bushing 24 is provided with the usual bonnet 31 and packing 32 for the valve-operating stem 28.

33 is the usual valve handle.

By this construction it will be observed that the valve-disk guide 13 is rigidly connected with the valve stem 6, and by reason of the sliding connection between the valve stem 6 and the valve operating stem 28 and the interposed spring 20, the valve disk 5 is yieldingly supported and guided within the valve body, and is capable of manual operation through the valve-operating stem 28 and its squared connection with the valve stem 6 for opening or closing the valve when desired, the screwthreaded portion 9 of the valve stem 6 working in the screwthreaded opening 17 in the valve-disk guide 13 for effecting the opening or closing movements of the valve stem. During the manual operation of the valve, the valve-disk guide is prevented from turning in the valve body by its engagement with the guides 11, and is held against longitudinal movement in either direction by the spring 20 and the stops 12.

When the valve is used in connection with steam cylinders for relieving the cylinder of undue pressure or accumulation of water of condensation, the tension of the spring 20 is adjusted so that the valve will operate at any desired or predetermined pressure, and whenever the pressure exerted on the concave valve disk 5 is greater than that at which the spring is adjusted to operate, the valve will be forced from its seat against the tension of the spring 20, the valve stem 6 carrying with it its guide disk 13, and the slabbed off or cut away portion of the valve-disk guide will permit the passage of the water of condensation or other fluid pressure, and thus automatically relieve the cylinder of any undue pressure, and the valve returned to its closed position by the spring 20.

It will be observed that the sliding or movable valve-disk guide 13 and its engagement with the inner wall of the body and guides 11 will serve to centralize or maintain the position of the valve and its attached stem in their movements. With the concavo-convex valve-disk arranged as herein described, it will be evident that the valve will yield more readily under sudden pressure.

The shoulders or stops 12 on the guides 11, serve as an abutment for the valve-disk guide when operating the valve stem to manually open or close the valve, the valve-disk guide being adjusted to just clear the stops 12 (as shown in Fig. 1) when the valve is set for automatic operation.

It will be observed that the tension of the spring 20 may readily be adjusted by loosening the lock-nut 27 and adjusting the bushing 24, which in turn engages the follower disk 18.

When it is desired to renew or replace the parts of the valve, access to the body of the valve is obtained by simply loosening lock-nut 27 and removing the bushing 21, whereby it will be observed all the interior parts of the valve may be removed from the body for repairing, renewing or cleansing.

I do not wish to be understood as limiting the invention to the exact details of construction herein shown and described, as the same may be changed in various particulars without altering the scope of the invention, nor do I wish to be understood as limiting the invention to its use in connection with steam cylinders as it is equally applicable to other purposes.

What I claim is:—

1. An automatic safety valve, comprising a body having inlet and outlet ports and a valve seat adjacent to the inlet port, a valve disk adapted to fit upon said seat, a valve stem to which said valve is connected and having a screwthreaded portion, a valve-disk guide movable in said body and engaging the screwthreaded portion of said valve stem, a spring and means for adjusting its tension engaging the valve-disk guide to hold the valve disk to its seat and permit its automatic operation, and a valve-operating stem slidably engaging the upper end of the valve stem to rotate the valve stem to adjust it with relation to the valve-disk guide to manually open and close the valve.

2. An automatic safety valve, comprising a body having inlet and outlet ports and a valve seat adjacent to the inlet port, a concave valve disk adapted to fit upon said seat, a valve stem to which said valve is connected and having a screw threaded portion, a valve-disk guide movable in said body and engaging the screwthreaded portion of said valve stem, a spring and means for adjusting its tension engaging with the valve-disk guide to hold the valve disk to its seat and permit its automatic operation, and a valve-operating stem slidably engaging the upper end of the valve stem to rotate the valve stem to adjust it with relation to the valve-disk guide to manually open and close the valve.

3. An automatic safety valve, comprising a body having inlet and outlet ports and a valve seat adjacent to the inlet port, a valve disk adapted to fit upon said valve seat, a valve stem to which said valve is connected and having a screwthreaded portion, a valve-disk guide arranged in said body, guides on said body upon which said valve-disk guide is movable, a screwthreaded opening in said valve-disk guide engaging the screwthreaded portion of the valve stem, a spring, and means for adjusting its tension engaging said valve-disk guide for holding said valve disk to its seat to permit the automatic opening of the valve, and a valve-operating stem slidably engaging the valve stem for rotating the valve stem to adjust it with relation to the valve-disk guide to manually open and close the valve.

4. An automatic safety valve, comprising a body having inlet and outlet ports and a valve seat adjacent to the inlet port, a valve disk adapted to fit upon said valve seat, a valve stem to which said valve is connected and having a screwthreaded portion, a valve-disk guide arranged in said body, guides on said body upon which said valve-disk guide is movable, stops on said guides for limiting the movement of the valve-disk guide, a screwthreaded opening in said valve-disk guide engaging the screwthreaded portion of the valve stem, a spring and means for adjusting its tension engaging said valve-disk guide for holding said valve disk to its seat to permit the automatic opening of the valve, and a valve-operating stem slidably engaging the valve stem for rotating the valve stem to adjust it with relation to the valve-disk guide to manually open and close the valve.

5. An automatic safety valve, comprising a body having inlet and outlet ports and a valve seat adjacent to the inlet port, a valve disk adapted to fit upon said valve seat, a valve stem to which the valve disk is connected and having a screw-threaded portion, a valve-disk guide movable in said body and having a screwthreaded opening engaging the screwthreaded portion of the valve stem, a follower disk arranged in said body, a coiled spring interposed between said valve-disk guide and said follower disk to hold the valve disk to its seat to permit automatic operation of the valve, an adjustable screwthreaded bushing fitted in the body of the valve and engaging the follower disk for adjusting the tension of the spring, and a valve-operating stem slidably engaging the valve stem for rotating the valve stem to adjust it with relation to the valve-disk guide to manually open and close the valve.

6. An automatic safety valve, comprising a body having inlet and outlet ports and a valve seat adjacent to the inlet port, a valve disk adapted to fit upon said valve seat, a valve stem to which the valve disk is connected and having a screwthreaded portion, a valve-disk guide movable in said body and having a screwthreaded opening engaging the screwthreaded portion of the valve stem, a follower disk arranged in said body, a coiled spring interposed between said valve-disk guide and said follower disk to hold the valve disk to its seat to permit automatic operation of the valve, a removable bushing fitted in the body of the valve, an adjustable bushing fitted in said removable bushing and engaging the follower disk for adjusting the tension of the spring, and a valve-operating stem slidably engaging the valve stem for rotating the valve stem to adjust it with relation to the valve-disk guide to manually open and close the valve.

In testimony whereof, I have hereunto set my hand this 26 day of Feb. 1912.

CHARLES A. MOORE.

Witnesses:
M. S. LAMBERT,
T. G. MINOUGHAN.

---

Copies of this patent may be obtained for five cents each, by addressing the "Commissioner of Patents, Washington, D. C."